(No Model.)

I. A. BEALS.
CUTTING SHOE GORES.

No. 303,256. Patented Aug. 12, 1884.

Witnesses.
S. N. Piper.
E. B. Pratt.

Inventor.
Isaiah Additon Beals
by R. H. Eddy atty.

UNITED STATES PATENT OFFICE.

ISAIAH ADDITON BEALS, OF BROCKTON, MASSACHUSETTS.

CUTTING SHOE-GORES.

SPECIFICATION forming part of Letters Patent No. 303,256, dated August 12, 1884.

Application filed June 2, 1884. (No model.)

*To all whom it may concern:*

Be it known that I, ISAIAH ADDITON BEALS, of Brockton, in the county of Plymouth, of the Commonwealth of Massachusetts, have invented a new and useful Improvement in Cutting Shoe-Gores from Cloth or other Material; and I do hereby declare the same to be described in the following specification and represented in the accompanying drawings, of which—

Figure 1:
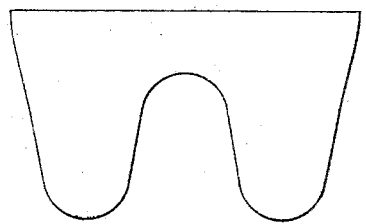
Figure 2:
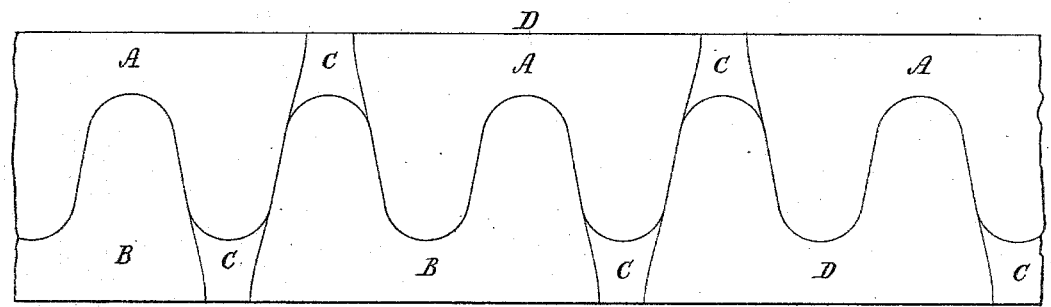

Figure 1 is a representation of a duplex shoe-gore of the kind to be cut from a strip of cloth by my invention, the nature of which is defined in the claim hereinafter presented. Fig. 2 is a view of a strip of cloth of the necessary width to obtain therefrom two ranges of duplex gores, such view exhibiting the method of dividing it for obtaining such gores from it.

The gore shown in Fig. 1 is of the kind termed "duplex," as it is not only to be arranged in the front part of the leg of a shoe, but in both sides of such leg.

Fig. 2 shows a strip, D, of uniform width as cut into gores and waste pieces in accordance with my invention, A A A being one series of gores having their bases at one edge, and B B B, &c., another series having their bases at the opposite edge of such strip. The several gores of one series project within those of the other series in such manner that each gore of each series not only extends within the opening of a gore of the other series, but between the latter gore and one immediately next to it, there being between each two gores of each series and the gore extending between them a waste piece, C, as represented.

By means of two rollers placed one over the other with their axes parallel, and knives suitably arranged and to project from the periphery of one of such rollers to that of the other, a strip of cloth, when the rollers may be revolved so as to draw it between them, may be separated into two series or ranges of waste pieces and duplex gores, substantially as represented, such waste pieces constituting a small portion or portions of the said strip, and in some cases utilizable, though generally being of little if any value. Each gore is cut by a knife separately from the strip, so as to project into and form the notch of another gore, and extend between such gore and that next it, in the same range with it, the three gores forming and having between them a waste piece, as represented. By this method the strip is lengthwise cut along the middle with a wavy or curved line, the curves being the same length, and at the same time that part of the strip along each edge at the ends of the alternate curves is cut away. Thus the strip is cut up into gores with slight waste, the gores on one side interlocking with those on the other.

What I claim is—

The method of forming gores from a strip of material, which consists in cutting the strip lengthwise along its middle in a wavy or curved line, the curves of such line being alike, and removing on each side of the strip that part which is just outside of the ends of each alternate curve, as set forth.

ISAIAH ADDITON BEALS.

Witnesses:
R. H. EDDY,
E. B. PRATT.